(No Model.) 2 Sheets—Sheet 1.
G. CALLS & F. J. TETLEY.
HORSESHOE FASTENING.

No. 481,000. Patented Aug. 16, 1892.

Witnesses:
Walter Allen
John Cullen

Inventors.
Frederick J. Tetley, and
George Calls.
by Herbert W. T. Jenner
Attorney.

(No Model.) 2 Sheets—Sheet 2.

G. CALLS & F. J. TETLEY.
HORSESHOE FASTENING.

No. 481,000. Patented Aug. 16, 1892.

UNITED STATES PATENT OFFICE.

GEORGE CALLS AND FREDERICK JOHN TETLEY, OF LONDON, ENGLAND.

HORSESHOE-FASTENING.

SPECIFICATION forming part of Letters Patent No. 481,000, dated August 16, 1892.

Application filed February 3, 1892. Serial No. 420,177. (No model.)

*To all whom it may concern:*

Be it known that we, GEORGE CALLS, farrier, residing at Fulham, and FREDERICK JOHN TETLEY, engineer, residing at Thames Ditton, London, county of Middlesex, England, subjects of the Queen of Great Britain and Ireland, have invented certain new and useful Improvements in Shoeing Horses; and we do hereby declare the following to be a full, clear, and exact description of the invention, such as will enable others skilled in the art to which it appertains to make and use the same.

This invention for improvements in fixing shoes to horses and the like has for its object to securely fix shoes to the hoofs of horses or other animals without the use of nails, screws, or the like, and to construct the shoes in such manner that they can readily be fixed by unskilled persons.

In a shoe constructed according to this invention lateral motion of the shoe is prevented by means of a toe-piece and lugs at the heel, which embrace the hoof, and also by means of short spikes projecting from the shoe and which enter the hoof. The lugs are perforated to receive a narrow steel or iron band, and at intervals around the shoe at its upper and outer edge are loops, also for receiving narrow steel or iron bands. In order to fix the shoe, it is applied to the hoof in the ordinary manner and forced into close contact therewith, the lugs and toe-piece embracing the hoof. An encircling steel or iron band is then passed around the front of the hoof, and its ends are passed through the holes in the lugs and bent over on the band to firmly secure the band in position. This encircling band is then forced or drawn down the hoof until perfectly tight, and depending bands are passed around it and through the loops in the shoe and their ends bent over so as to hold the shoe to the hoof.

Figure 1:
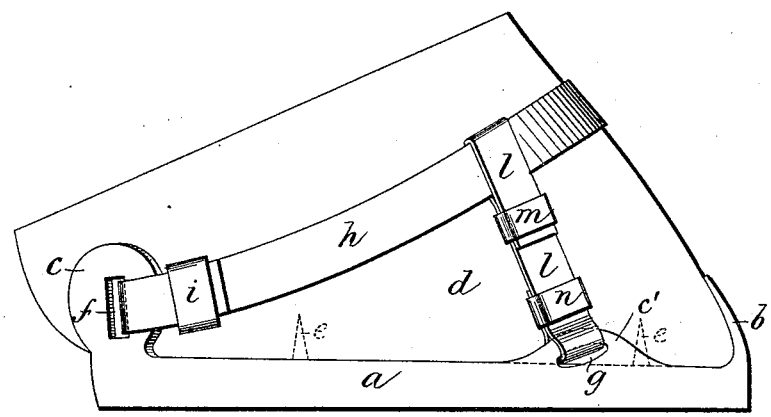
Figure 3:
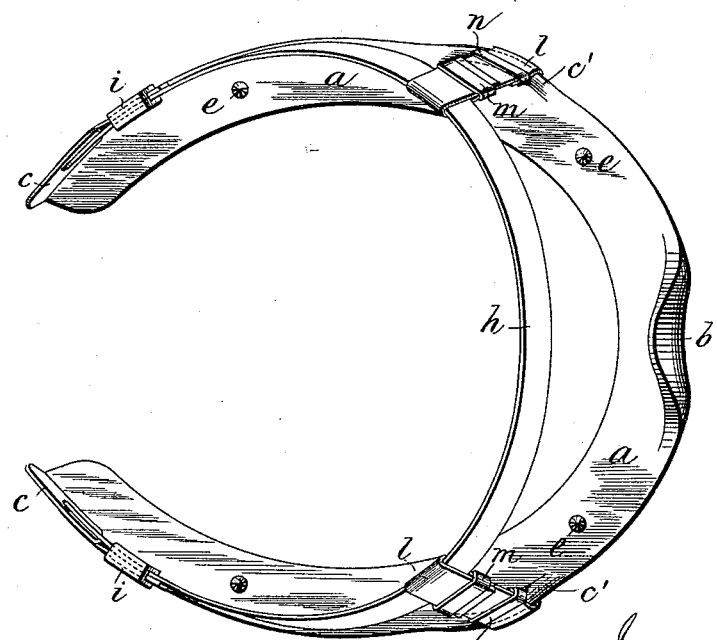
Figure 2:
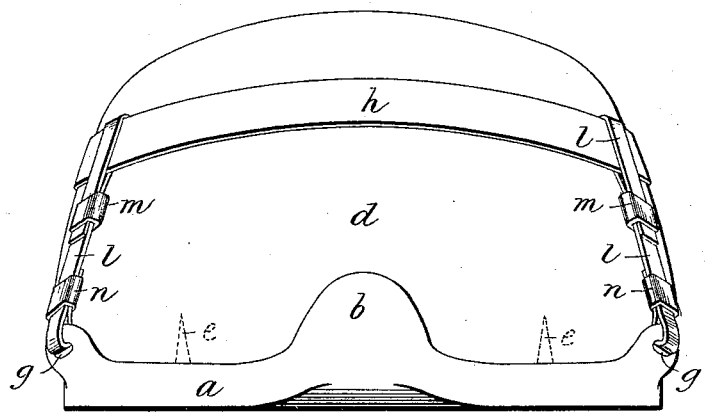

In the accompanying sheet of illustrative drawings, Figure 1 is a side elevation of a hoof, showing the method of fixing the shoe according to this invention. Fig. 2 is a front elevation of the same, and Fig. 3 is a plan of the shoe and fixings.

The shoe $a$ is provided at the front with a toe-piece $b$ and the back with lugs $c$, projecting upward from the upper side of the shoe so as to embrace the hoof $d$ and prevent lateral motion. Spikes $e$, also projecting upward from the upper side of the shoe, assist in keeping the shoe in place. The lugs $c$ are each perforated with a narrow vertical slit $f$. Narrow slits $g$ are formed at intervals around the shoe in projections $c'$ from the shoe, which projections also clip the hoof and assist in preventing lateral motion of the shoe.

In fixing a shoe to a hoof according to this invention the shoe $a$ is applied to the hoof and hammered or otherwise forced into firm contact with the hoof $d$, the spikes $e$ entering the hoof and the toe-piece $b$ and lugs $c$ embracing it. The encircling steel band $h$ is then passed around the front of the hoof, and its ends are passed through the slits $f$ in the lugs $c$ and turned back on the band and secured by the loops $i$, which slide on the encircling band $h$ and are passed over the ends, as clearly shown. The encircling band $h$ is then forced down the hoof toward the toe-piece until perfectly tight, and the ends of depending steel bands $l$ are passed under the encircling band $h$ and are bent over and secured by the loops $m$, sliding on the depending bands $l$ and passed over their ends, and the other ends of the depending bands $l$ are passed through the slits $g$ and are pulled tight and bent over and secured by the loops $m$. It will readily be seen that the growth of the hoof itself will tend to further fix the shoe while in use.

What we claim, and desire to secure by Letters Patent, is—

The combination, with a horseshoe provided with projections $b$, $c$, $c'$, and $e$ for engaging the hoof of the animal, of the flat band $h$, passing over the hoof and bent back upon itself after passing through the projections $c$, the loops $i$, securing the ends of the band $h$, the flat bands $l$, having their ends bent back upon themselves and connecting the band $h$ with the projections $c'$ at the sides of the shoe, and the loops $m$ and $n$, securing the ends of the bands $l$, substantially as and for the purpose set forth.

In testimony whereof we affix our signatures in presence of two witnesses.

GEORGE CALLS.
FREDERICK JOHN TETLEY.

Witnesses:
WILMER M. HARRIS.
JOSEPH LAKE.